June 7, 1927.
J. S. FORBES
1,631,586
VALVE
Filed May 9, 1923
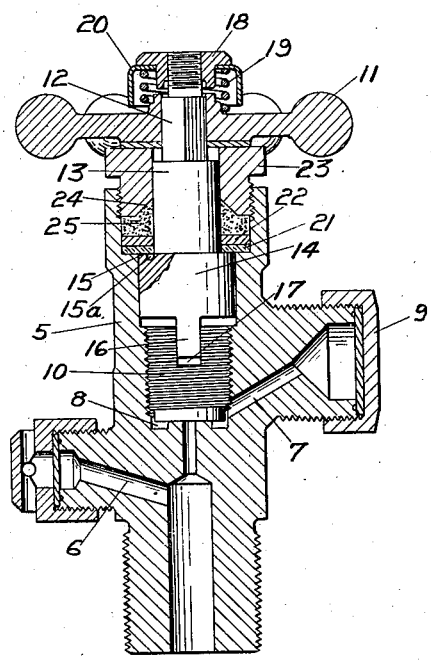
INVENTOR
John S. Forbes
by W. G. Doolittle
Attorney Patented June 7, 1927.

1,631,586

UNITED STATES PATENT OFFICE.

JOHN S. FORBES, OF PITTSBURGH, PENNSYLVANIA, ASSIGNOR, BY MESNE ASSIGNMENTS, TO KEROTEST MANUFACTURING COMPANY, OF PITTSBURGH, PENNSYLVANIA, A CORPORATION OF PENNSYLVANIA.

VALVE.

Application filed May 9, 1923. Serial No. 637,653.

This invention is for an improvement in valves, particularly, valves of the type used in oxygen, hydrogen, carbonic acid gas, or other gas cylinders.

Valves of this type are, of course, subject, when both opened and closed, to considerable pressure, and consequently, it is very difficult to prevent leakage, especially when the valve is open and the gas can work up around the valve stem and escape.

The present invention has for its object to provide a novel packing in valves of this type.

The invention may be readily understood by reference to the accompanying drawing, in which the figure is a vertical section through a valve embodying the invention, part of the valve stem also being broken away.

In the drawing, 5 designates the valve body having the usual safety outlet 6, and having a connection 7 through which gas passes from valve chamber 8 to an outlet pipe, not shown, which may be screwed to the connection in place of the stopper plug 9.

Threaded in the valve chamber 8 is the usual plug 10, which is turned to move it into or out of engagement with the valve seat. Turning of the valve is effected through a wheel 11 slidably retained on the square end 12 of a round valve stem 13 having an enlarged lower portion 14, a shoulder or packing seat being formed on the top of the enlarged portion at 15, an annular channel 15ª intervening between the packing seat and the stem. Part 14 carries a tang 16 which may be integral and which is slidably entered in a slot 17 in the plug 10. The hand wheel is retained on the stem by a nut 18, a spring 19 being interposed between the nut and wheel for the purpose of resiliently urging the valve stem upwardly. A protecting cap 20 may be provided over the spring.

So much of the valve as has been described is old and is now in wide commercial use. It has heretofore been the practice to provide a fibre washer to bear against the packing seat 15, which washer was held in place by a nut threaded into the top of the valve body. When a valve so constructed was open, the gas under pressure was supposed to leak around the plug 10 and press up on the enlarged stem portion 14, and thereby hold the sealing seat in sealing engagement with the fibre washer.

Such a construction is not entirely satisfactory in preventing leakage, but is, nevertheless, a desirable feature. The present invention retains this fibre washer, which is designated 21, and mounted on top of the fibre washer is a bronze or other suitable metal washer 22. At 23 is a nut which threads into the valve body, the inner face of the nut being upwardly beveled at 24. Interposed between the lower end of the nut and the metal washer is a mass of asbestos packing material 25.

When the nut 23 is screwed down, the packing is forced into engagement with the surface of the valve stem, forming an effective packing around the stem. The asbestos packing also transmits pressure to the metal washer 22 forcing it down to compress the fibre washer and hold said washer in position to bear against the packing seat. If the metal washer were not used, the fibre washer would be forced out of shape and be pushed down further into the valve body, and thereby defeat its own purpose.

By the packing in the manner described, it is possible to have a seating surface and a packing surface, a result heretofore unknown in the trade. Two packings are provided, one between the seat 15 and the fibre gasket, and the other being provided about the stem by the compressed asbestos ring. Both packings may be tightened at the same time by adjusting the one packing nut 23.

While it is old in the art to pack the stem or to provide a seating surface which packs, I am not aware that in any valve are both means simultaneously employed. The means described provide an effective packing, well adapted to stand the pressure to which it is necessarily subject.

I claim as my invention:

1. A valve including a body having a valve chamber therein, a plug screwed into the valve chamber, a valve stem having a hand wheel and a tang, said tang engaging the plug for turning it, a seating shoulder on the stem, a fibre washer in the valve body around the stem and above the seating shoulder, a mass of packing material above the fibre washer, a rigid member interposed between the fibre washer and the packing and vertically movable relatively to the stem, and a nut having a lower beveled portion to receive a portion of the mass of packing material, said nut acting to force the washer down into sealing relation with the seat and simultaneously compressing the mass of packing material about the stem.

2. In a valve, a body having a valve chamber therein, a valve member operable in the chamber, a valve stem having a seating shoulder, packing means including a fibre washer coacting with the shoulder, packing means including a mass of packing material cooperating with the stem, both of said packing means being in a common cavity in the valve body, a non-compressible member loosely surrounding the stem between said packings, and common means having a beveled packing material contacting face for forcing both packings into sealing relation.

In testimony whereof I affix my signature.

JOHN S. FORBES.